April 30, 1940.    E. S. HOLM    2,198,819
LIQUID FILTERING APPARATUS
Filed July 19, 1937
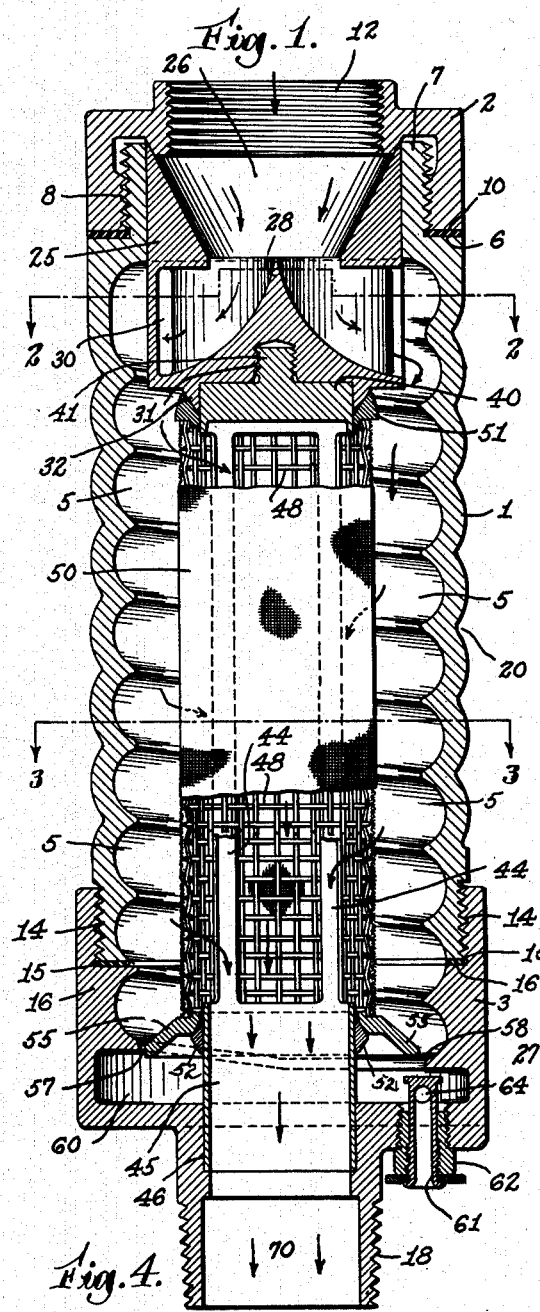
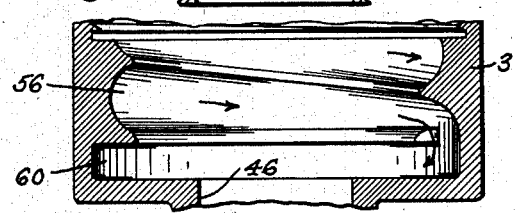
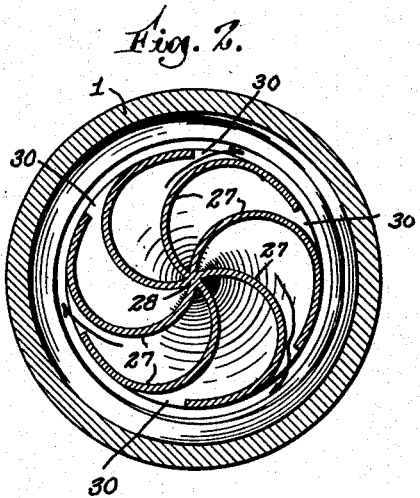
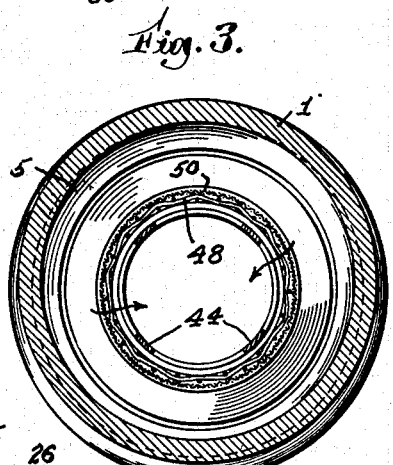
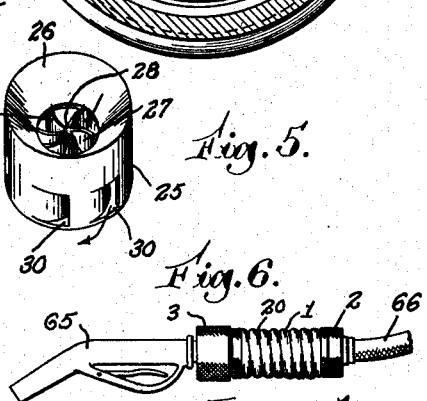
Inventor
Ernest S. Holm
by James R. Hodder
Attorney Patented Apr. 30, 1940

2,198,819

UNITED STATES PATENT OFFICE 2,198,819

LIQUID FILTERING APPARATUS

Ernest S. Holm, Wollaston, Mass.

Application July 19, 1937, Serial No. 154,379

15 Claims. (Cl. 210—154)

My present invention is a novel and improved liquid filtering apparatus particularly intended for filtering hydrocarbon fuels, gasoline, or other liquid fuels.

Heretofore it has been customary to employ various types of filtering devices thru which gasoline, or the like, is passed in an effort to free the liquid fuel from sediment or the like impurities before it is fed to the tank or receptacle immediately supplying an internal combustion engine.

Such prior filtering devices have been of cloth, fine mesh wire screening, or apparatus utilizing to some extent the centrifugal principle for separating the sediment from the liquid. Such prior devices, so far as I am informed, have been unsatisfactory in various ways, the ordinary screening devices quickly filling up and clogging, besides being inefficient in removing the finer sediment, and such prior centrifugal operating devices being only partially efficient, such prior devices having a construction which fails to draw off the liquid while the centrifugal action is in operation, in a way to gain full advantage of the same.

In my present invention I have eliminated the difficulties heretofore existing in this type of apparatus, and I have devised a novel, improved, efficient and compact filtering apparatus completely automatic in its operation and which effects a filtering and cleaning action on liquid fuels while permitting higher speed of delivery thru the apparatus than has heretofore been possible.

The filtering of liquid fuels is, of course, most necessary, as sediment, water, or other impurities frequently cause stoppage of the internal combustion engine, clogging the needle valves thru which the liquid is fed, and this is of course particularly important in feeding fuel into aeroplanes where stoppage of the engine is most serious and wherein, also, speed in filling the fuel tank is of considerable importance.

It is an important object of my present invention to insure a centrifugal flow of liquid fuel throughout substantially the entire length of the filtering apparatus and to draw off from the center or core of the liquid thus being fed thru the apparatus the lighter, cleaner, and sediment-free liquid, while the heavier liquid, sediment, and water is thrown or held outwardly by centrifugal action throughout the entire length of the core being thus withdrawn.

It is an important feature of my present invention to provide filtering means which will permit a high-speed of liquid delivery thru the strainer, viz., to the full capacity of the pipe or hose line being utilized in such liquid delivery. Also, it is an important feature of my present invention to provide my improved filtering apparatus at any point desired, either at the delivery pump or at the delivery nozzle of the hose or conduit. This is of special desirability since I am thus enabled to also filter the liquid from carrying particles from the conduit or hose into and thru the delivery nozzle.

Where any iron pipes are utilized from the gasoline pump to the delivery nozzle rust and other impurities are liable to be carried, while in flexible textile hose, threads, ravelings, shreds of the material are liable to be carried by the liquid, all of which are liable to plug the valves and stop the motors. Owing to the compactness of my apparatus I may utilize the same directly at the delivery nozzle, a most important advantage and one which has not heretofore been practical in any centrifugal type of filtering apparatus so far as I am informed.

While I may utilize any suitable or desired means to effect the centrifugal flow of the liquid thru the filter, I prefer to employ a rigid device relatively fixed with the rest of the filter, which I have termed a spinner, and utilize the flow of the liquid thru the same to impart the centrifugal action thereto. The speed of delivery will, therefore, be a factor in determining the extent of the separation of the heavier oils, the water contained in same, and the sediment or impurities in solution as the liquid flows thru the spinner and is thrown against the outer wall of the apparatus.

In order to insure the continuance of this centrifugal action initiated by the spinner and the liquid flow therethrough, I have provided a series of spiral curves which are effective not only to continue the centrifugal action throughout the entire length of the apparatus while the liquid in the clean core is being drawn off, but also to positively feed and conduct the sediment beyond the core and into a chamber or receptacle at the opposite end of the apparatus.

Thus my present invention operates to automatically effect and continue the separation of the heavier part as well as the impurities and sediment in liquid fuel to maintain a clean core, which is being continually led off to the delivery nozzle, with means to carry the sediment beyond the core and all automatic and by the simple positioning of my filtering apparatus at any point desired within the conduit for such delivery.

Thus my apparatus insures the filtering of liquid fuels while also maintaining the screens around the core thru which the clean liquid is drawn, free from clogging by foreign matter, thereby maintaining full efficiency and full capacity at all times. I provide simple means to effect cleaning of the sediment-receiving receptacle or chamber, and also I have developed a construction permitting easy assembly and disassembly for the removal and replacement of screens around the core, and all in an extremely compact, efficient, light apparatus.

Further features, novel combinations, and important advantages will be hereinafter more fully pointed out and claimed.

Referring to the drawing illustrating a preferred embodiment of the invention,

Fig. 1 is a longitudinal cross-sectional view of my improved filtering apparatus;

Fig. 2 is a cross-sectional view on the line 2—2 of Fig. 1;

Fig. 3 is a cross-sectional view on the line 3—3 of Fig. 1;

Fig. 4 is a fragmentary cross-sectional view of the base portion including the sediment receptacle;

Fig. 5 is a perspective on a reduced scale illustrating the spinner, and

Fig. 6 is a view diagrammatically illustrating the filtering apparatus at the nozzle of the liquid fuel delivery conduit.

Referring to the drawing, 1 designates generally the central cylindrical casting having an upper casting 2 at the intake end and a lower or bottom casting 3 at the delivery end. The central casting 1 is formed with an internal spiral groove 5 extending substantially throughout its length, and at the upper end is provided with a shoulder 6 and reduced diameter 7 having an externally threaded portion adapted to cooperate with a correspondingly threaded internal portion of the casting 2, as indicated at 8. A washer 10 between the shoulder part 6 and the end of the casting 2 serves to effect a liquid-tight joint at this point. The casting 2 also has an internally threaded opening 12 for attachment to the conduit, hose, or pipe in which my filtering apparatus is to be utilized.

At the opposite end of the cylindrical member 1 cooperating threads between the member 1 and the bottom casting 3 are provided, as indicated at 14, which bear against a washer 15 between the end of the casting 1 and an annular shoulder 16 formed on the casting 3, as clearly indicated in Fig. 1 to effect a liquid-tight joint, the opposite end of the casting 3 being provided with a pipe-like and threaded extension 18 for attachment to the nozzle or the continuous conduit if the filtering apparatus is positioned near the bottom or intermediate the hose and nozzle.

While I have shown the cylindrical casting 1 in the drawing with an exterior fluted spiral surface as indicated at 20, in order to make the cylinder 1 of substantially equal thickness of metal, it will be appreciated that the important feature is the internal spiral groove 5 and the exterior surface may be smooth or correspondingly fluted, as shown.

Contained within the cylinder 1 and end portions 2 and 3 are the spinner, the central screen, and the sediment-collecting portion, all of novel construction and which will now be explained. I prefer to remove the spinner, the screen, and the supporting means therefor as a separate unit which may be fitted within the cylinder and firmly locked in position by the threading of the end portions 2 or 3, which clamp same together.

Preferably, and as herein shown, I attach the tube 45 by soldering, welding, or threading to the end piece 3 and hence when the end 3 is unscrewed the entire frame, screen, and attached spinner are withdrawn. By providing left-hand threads on the spinner, the reaction of the liquid thru the spiral channels of the spinner serves to tighten the threads and prevent unscrewing.

The spinner comprises a casting 25 formed with a conical upper opening 26 flaring in the line of liquid flow to receive same from the hose or conduit and conduct same into the spiral paths formed by a plurality of partitions 27—27 leading from a center 28 and out thru nozzle-like openings 30—30 to impart a centrifugal current and directional flow to the liquid fuel thus producing a nozzle-like effect and accentuating the centrifugal action of the fluid from the nozzle openings 30 into register with and around the spiral grooves 5 in the cylinder 1.

The area and capacity of these nozzle-like openings 30 may be constructed for the greatest efficiency as to size and capacity for which the filter is intended to be used, the arrows as shown in Figs. 1 and 2 indicating the liquid flow. The spinner 25 is provided with a central threaded recess 31 and with a downwardly extending flange 32, and also is of appropriate diameter to fit snugly between the top portion of the cylinder 1 and the threaded section 12 of the end 2, substantially as shown in Fig. 1. The top 2 is screwed down firmly onto the gasket 10, thus affording a liquid-tight joint at this end.

An important feature of my novel spinner consists in the conical or bevelled receiving face 26 constructed and arranged to partially cover the spiral passages formed by the partitions 27 and thus give an added direction in a centrifugal line of travel, as shown by the arrows, to the liquid flowing therethru, being still further increased in speed and direction by the restricting of the liquid flow thru the conical face 26 and the nozzle openings 30.

A central supporting framework or arbor is provided, comprising a solid head 40 having a threaded central stud 41 adapted to be threaded into the recess 31 in the bottom of the spinner 25 and with a plurality of spaced arms or rod-like portions, preferably four in number of which two, as indicated at 44—44, are shown in Fig. 1, and connect the head 40 with a bottom pipe-like portion 45, which is adapted to fit within a counterbored section 46 in the end piece 3. Around these rod-like portions 44 I apply one or more screen members, preferably fitting first a large open mesh screen 48 principally as a support for the finer screening metal mesh 50, which latter may be of any desired size and quality of mesh. The collar 51 at the top or one end and the apron 55 are secured to the screen, while a bottom collar 52 is secured to the tubular portion 45, as clearly shown in Fig. 1.

Also I provide at the bottom portion an apron 55 fitted around the pipe portion 45 of the central support, which apron 55 extends outwardly, narrowing the opening between the adjacent spiral groove 56 formed in the base 3 to cooperate with the groove 5 in the cylinder 1, thus leaving a relatively narrow space between the rim of the apron 55, as indicated at 57 and 58. This apron 55 also aids in forming the sediment-collecting chamber 60, preferably of larger diameter than the interior grooves 5, in the lower portion of the end piece 3 and prevents the swirling or whirling action of the centrifugal stream of liquid from flowing back and up, thus maintaining the central core of liquid clean and clear at all times.

This enables the sediment to collect and accumulate in the chamber 60, to be drawn off as desired by the valve 61 threaded thru a plug 62 into a recess in the end 3, a port 64 opening into the sediment receptacle 60 when threaded therein or being closed when the same is reversely rotated, this being shown in open position in Fig. 1.

The operation of my filtering apparatus is extremely efficient, simple, and automatic. With the filter constructed and assembled substantially as described and fitted in a conduit, hose, or the like, such for example as shown in Fig. 6 between the valve nozzle 65 and hose 66, usually employed where force or pressure feed is utilized, the opening of the valve will permit a flow thru the filtering apparatus or liquid entering at the inlet end, as shown in the direction of the arrows, Fig. 1, flowing thru the conical portion of the spinner 25 and outwardly into the grooves therein and thru the delivery openings 30, initiating the centrifugal line of flow of the liquid throwing the heavier parts of the fuel, sediment, impurities, and heavier liquid, water and the like, outwardly against the walls of the groove 5, which continue the centrifugal flow downwardly and substantially or entirely throughout the length of the filtering apparatus, thus creating and maintaining a clean, clear central core of liquid, which flows thru the screen 50 without interrupting or stopping the centrifugal flow around the spiral grooves 5, thus filling the center within the screen and flowing outwardly of the delivery opening 70 thru the pipe portion 45 which protects the central flow of liquid as thus carried thru the sediment chamber 60.

This action continues so long as the liquid flows thru the filtering apparatus at any ordinary speed of delivery.

It is within the scope of my invention to position one or more of these filtering apparatus at any point in a conduit, pipe, or hose, or to have the same as a separate filling fixture, removably held or positioned at the tank being filled; or to incorporate the filter in immediate combination with, or as an integral part of, the valve 65, substantially as shown in Fig. 6. The compactness and efficiency of my apparatus and its adaptability for any size conduit and high delivery speed are important advantages.

I believe that my construction, insuring a clean core from which the filtered liquid is drawn off, maintaining the screens free of clogging and at the highest efficiency at all times, while insuring the flow and conduction of the heavier portions, sediment, impurities, etc., throughout the entire extent of the filtering apparatus and into a trap, maintaining the central core clean and clear is a distinct novelty in this art and I wish to claim the same herein broadly, as well as the various novel features of construction effecting the same.

I claim:

1. A filtering device comprising, a cylindrical casing having an inlet and an outlet in alignment, a substantially cylindrical screening element positioned coaxially within said casing intermediate said inlet and outlet, said screening element having a discharge opening in communication with the outlet of said cylindrical casing, and means associated with the inlet of said casing and in advance of said screening element provided with passageways arranged and constructed to discharge liquid outwardly against the inner wall of said cylindrical casing in a direction circumferentially of said wall.

2. A filtering device comprising, a cylindrical casing having an inlet and an outlet, an elongated filter element positioned concentrically in said cylindrical casing between said inlet and outlet, said filter element having a discharge opening in communication with the outlet of said casing, a spinner at the inlet end of said casing, said spinner having a conical recess coaxial with the casing and a plurality of generally spiral grooves underlying said conical recess for imparting a spiral line of flow to the liquid passing therethrough, whereby said liquid is directed outwardly and against the inner wall of said casing in a direction circumferentially of said filter element.

3. A filtering device comprising, a cylindrical casing having an inlet and an outlet in alignment, said casing being provided on substantially the whole of its interior surface with a spiral groove, a substantially cylindrical screening element positioned concentrically in said cylindrical casing, said screening element having a discharge opening in communication with the outlet of said cylindrical casing, means extending into the inlet of said casing arranged and constructed to direct liquid outwardly against the inner wall of said casing into one end portion of said spiral groove, and a sediment collecting chamber at the opposite end portion of said spiral groove.

4. As an improved article of manufacture, filtering apparatus comprising a cylindrical member formed with a spiral groove on the inner surface thereof, screening means positioned centrally of said cylindrical member, means at the intake end of said cylindrical member to direct liquid flowing therethru into said spiral groove, and a sediment-receiving chamber at the outlet end of greater diameter than that of said cylindrical member.

5. For use in a filtering apparatus, a device for imparting rotary motion to a flowing liquid comprising, a cylindrical body having a series of curved vanes extending outwardly from the axis of said body, each of said vanes having an outer end portion substantially concentric with said body and spaced from an adjacent vane to provide a restricted discharge opening through said body.

6. A device as defined in claim 5 in which the material of the body between adjacent vanes includes a portion curved outwardly relatively to the axis of said cylindrical body.

7. Filtering apparatus of the kind described, having a cylindrical member with a liquid inlet, said cylindrical member being formed with an internal spiral groove, a screened outlet coaxially positioned within said cylindrical member, a spinner positioned adjacent said inlet, said spinner having a central receiving opening and a plurality of lateral discharge openings constructed and arranged to discharge liquid passing therethru tangentially into the spiral groove of said cylindrical member.

8. Filtering apparatus of the kind described comprising a cylindrical member having an inlet and being provided with an internal spiral groove adapted to conduct liquid being filtered, a screened opening positioned coaxially of said cylindrical member thru which liquid is conducted from the apparatus, and a coaxial spinner at the inlet of said cylindrical member thru which said liquid passes, said spinner having vanes and openings constructed and arranged to direct the liquid into said spiral groove and to increase the velocity of said liquid as it flows through the spinner.

9. Filtering apparatus of the kind described comprising a cylindrical member having an inlet and being provided with an internal spiral groove adapted to conduct liquid being filtered, a screened opening positioned centrally of said cylindrical member thru which liquid is conducted from the apparatus, and a coaxial spinner at the inlet of said cylindrical member thru which said liquid passes, said spinner being constructed and arranged to direct liquid flowing therethru into said spiral groove with an increased velocity relative to that at which it enters said spinner and to discharge the same into said spiral groove at substantially a right angle to the flow of incoming liquid to said spinner.

10. Filtering apparatus of the kind described comprising a cylindrical member having an inlet and being provided with an internal spiral groove adapted to conduct liquid being filtered, a screened opening positioned centrally of said cylindrical member thru which liquid is conducted from the apparatus, and a coaxial spinner at the inlet of said cylindrical member thru which said liquid passes, said spinner being constructed and arranged to direct liquid flowing therethru into said spiral groove and to discharge the same with an increased velocity substantially tangential to the flow of incoming liquid to said spinner.

11. A filtering device comprising, a casing having aligned inlet and outlet openings and a spiral groove arranged in its interior between said openings, filtering means positioned coaxially within said casing, and means at the inlet end of said casing arranged and constructed to direct liquid entering said casing outwardly of said casing and circumferentially into said spiral groove.

12. A filtering device comprising, a casing having an inlet and an outlet, said casing also having a spiral groove arranged in its interior, filtering means positioned coaxially within said casing, means at the inlet end of said casing arranged and constructed to direct liquid entering the same into said spiral groove, and a sediment receiving chamber at the outlet end of said casing.

13. A filtering device comprising, a casing having an inlet at one end thereof, a filtering core arranged within said casing, means at the inlet end of said casing engaging said casing and the upper end of said core to hold the same in position, and a cap engaging the lower end of said core to maintain the same in proper position, said core and cap having aligned discharge openings, said cap having a sediment collecting chamber formed therein in surrounding relation to said discharge openings.

14. A filtering device comprising, a casing having an inlet and an outlet and having a helical groove formed in its interior, a filtering core arranged coaxially with said casing, a spinner positioned at the inlet end of said casing, said spinner having vanes and openings positioned to discharge fluid circumferentially into said helical groove, a sediment collecting chamber at the discharge end of said core, and an annular apron operatively associated with said core adjacent said sediment-collecting chamber, said apron being peripherally spaced from said casing to provide a restricted passage leading to said sediment collecting chamber.

15. A filtering device comprising, a cylindrical casing having an inlet end and an outlet end, said casing having a threaded portion at its inlet end, said casing also having a helical groove formed in its inner wall, a collar threaded upon said inlet end, the outlet end of said cylindrical casing also being threaded and having a cap member mounted thereon, a filtering element disposed in said cylindrical casing including a central tubular member serving as an outlet for filtered fluid, and a generally cylindrical spinner between said tubular member and said collar at the inlet end of said cylindrical casing, said spinner having passageways arranged and constructed to discharge fluid through the side walls thereof into said helical groove, said cap member at the lower end of said casing having a recess, one end of the tubular member of said core being seated in said recess.

ERNEST S. HOLM.